US008655053B1

(12) United States Patent
Hansen

(10) Patent No.: US 8,655,053 B1
(45) Date of Patent: Feb. 18, 2014

(54) BODY MODELING AND GARMENT FITTING USING AN ELECTRONIC DEVICE

(76) Inventor: Andrew S Hansen, Bountiful, UT (US)

( * ) Notice: Subject to any disclaimer, the term of this patent is extended or adjusted under 35 U.S.C. 154(b) by 194 days.

(21) Appl. No.: 13/118,535

(22) Filed: May 30, 2011

Related U.S. Application Data

(60) Provisional application No. 61/349,978, filed on May 31, 2010, provisional application No. 61/429,132, filed on Jan. 1, 2011.

(51) Int. Cl.
*G06K 9/00* (2006.01)
(52) U.S. Cl.
USPC .......................................... 382/154
(58) Field of Classification Search
USPC .................. 382/115–118, 154, 181–231
See application file for complete search history.

(56) References Cited

U.S. PATENT DOCUMENTS

| | | | |
|---|---|---|---|
| 5,850,222 A | 12/1998 | Cone | |
| 5,864,630 A * | 1/1999 | Cosatto et al. | 382/103 |
| 6,160,924 A | 12/2000 | Lazar | |
| 6,292,575 B1 * | 9/2001 | Bortolussi et al. | 382/118 |
| 6,535,223 B1 * | 3/2003 | Foley | 345/629 |
| 6,901,379 B1 | 5/2005 | Balter | |
| 6,968,075 B1 * | 11/2005 | Chang | 382/111 |
| 7,212,202 B2 | 5/2007 | Weaver | |
| 7,386,429 B1 | 6/2008 | Fujisaki | |
| 7,656,402 B2 | 2/2010 | Abraham et al. | |
| 8,565,477 B2 * | 10/2013 | Geiss | 382/103 |
| 2002/0001398 A1 * | 1/2002 | Shimano et al. | 382/104 |
| 2002/0031253 A1 | 3/2002 | Dialameh | |
| 2002/0122596 A1 | 9/2002 | Bradshaw | |
| 2003/0016844 A1 * | 1/2003 | Numaoka | 382/100 |
| 2003/0101105 A1 | 5/2003 | Vock | |
| 2003/0142863 A1 * | 7/2003 | Massen | 382/154 |
| 2005/0180610 A1 | 8/2005 | Kato | |
| 2006/0039600 A1 | 2/2006 | Solem | |
| 2006/0050933 A1 | 3/2006 | Adam et al. | |
| 2006/0285770 A1 | 12/2006 | Lim | |
| 2007/0211921 A1 * | 9/2007 | Popp et al. | 382/115 |
| 2009/0157707 A1 | 6/2009 | Ito | |
| 2009/0271484 A1 | 10/2009 | Svendsen | |
| 2009/0313304 A1 | 12/2009 | Goodger | |
| 2010/0046842 A1 | 2/2010 | Conwell | |
| 2010/0103170 A1 | 4/2010 | Baloch | |
| 2010/0130250 A1 | 5/2010 | Choi | |
| 2010/0188503 A1 | 7/2010 | Tsai et al. | |
| 2010/0293076 A1 | 11/2010 | End et al. | |
| 2011/0055053 A1 | 3/2011 | Rutschmann | |

OTHER PUBLICATIONS

U.S. Appl. No. 12/475,308, filed May 29, 2005, Polzin.

* cited by examiner

*Primary Examiner* — Alex Liew
(74) *Attorney, Agent, or Firm* — Workman Nydegger

(57) ABSTRACT

Methods and systems for generating a size measurement of a body part of person for fitting a garment include providing photographic data that includes images of the body part and using feature extraction techniques to create a computer model of the body part.

20 Claims, 4 Drawing Sheets

BODY MODELING AND GARMENT FITTING USING AN ELECTRONIC DEVICE

CROSS-REFERENCE TO RELATED APPLICATIONS

This application claims the benefit of U.S. Provisional Patent Applications 61/349,978, filed May 31, 2010 and 61/429,132, filed Jan. 1, 2011, both of which are hereby incorporated herein by reference.

BACKGROUND

For more than a decade, the Internet, and particularly, the World Wide Web has been touted as an excellent medium for shopping for goods. E-commerce is now a multi-billion dollar business. Certain industries have had more success than others. The garment industry is one industry that has seen only limited success with Internet sales. One problem with the garment industry is the desire of the purchaser to try on a garment to see how it fits. For more than a decade, the problem with properly fitting a garment for sale through e-commerce has been known. Many attempts have been made to solve this problem. However, none of the methods and systems to date is accurate enough and/or convenient enough to attract the attention of buyers in a way that can fundamentally shift purchasing habits in the garment industry. Thus, there exists a long felt, but unmet need to overcome the issues with fitting garments for purchase in e-commerce.

SUMMARY

The present disclosure relates to methods and systems for obtaining a computer model of a body part of a person and/or a fitting measurement and methods and systems for obtaining a garment measurement and/or associating the computer model with a garment measurement to provide fitting. The computer model may be obtained using one or more photographs of a body part of a target subject and analyzing the photographic data to extract features of the body part. The model may be used to generate a fitting measurement for the user or to recommend clothing that is fitted to the user.

In one embodiment, the method may be carried out over a network by capturing the photographic data through a personal electronic device (e.g., a smart phone or similar portable electronic device) transmitting the photographic data to a server computer, analyzing the photographic data to obtain a 2-d or 3-d model and providing a fitting measurement to the user. The fitting measurement may be a body part size, a garment size and/or one or more particular garments that are fitted to the body part. The methods and systems can further include comparing the at least partial model of the body part to a database of computer profiles and/or a database of garment models to generate the fitting measurement.

In one embodiment, a 2-D or 3-D model can be generated by recording a series of images (e.g., video) of a body part of a person using an electronic device that includes a lens and a motion sensor. The lens is used to record the series of images of the body part and the motion sensor is used to simultaneously associate a spatial relationship between the plurality of images. For example, motion sensors such as accelerometers in a portable electronic device can provide spatial relationship between frames of a video recorded using a lens of the portable electronic device. The video and spatial relationship data can then be processed on the portable electronic device or transmitted to a host server for processing to generate the three dimensional model. Because the motion sensor can detect distances moved relative to the photographic data, the processing of the spatial data and video data can produce an approximation of the actual size of the body part. Additional details regarding methods for obtaining a 3D model of an object using a series of images and associated motion sensor data can be found in U.S. Patent Application Publication 2010/0188503 to Tsai et al, which is hereby incorporated herein by reference.

In a second embodiment, a 2-D or 3-D model of a body part can be generated by obtaining one or more 2-D images of a particular body part (e.g., foot, leg, head, etc) and extracting features of the body part from the 2-D image(s). The projection of the features in the 2-D image can be compared to a statistical model of variations in a class of a particular body part. The statistical model can be produced by scanning a particular body part (e.g., foot, leg, head, etc) of multiple people to obtain a statistical model of the variation of image features in 2D projections. Thus, variations in actual 3D body part features can have a statistically determined effect on the 2D projection. Once the statistical model is generated, a 2D image of a body part of the same class of body part can be compared to the statistically generated 2D projections of the 3D model to make a correlation therebetween. The 3D model can be generated by (i) obtaining 2D representations of the body part, (ii) detecting image features in the obtained 2D representation, and (iii) recovering a highly probably 3D shape of the body part based on a comparison of the obtained 2D representations to 2D features of a learned statistical multi-view shape model. Additional details regarding obtaining a 3D model from features in 2D images using a statistical model can be found in US Patent Application publication 2006/0039600 to Solem, which is hereby incorporated herein by reference.

In a third embodiment, the photographic data can include a marking of known dimension and the marking of known dimension can be used in part to determine the fitting measurement and/or to generate a model that is scaled to actual size. In one embodiment, a plurality of markings of known dimension can be used to generate the model and/or size measurement and the plurality can include marking dimensions of the same or different numerical value.

In some embodiments, the computer model of the body part can be generated from a plurality of cameras a fixed distance from one another. The two fixed cameras are used to capture images of the body part at different angles. A plurality of features of the body part are extracted from the image and used to create a model of the body part. The actual size of the object can be calculated using geometry.

In some embodiments of the invention, the imagery can include a series of photographs (e.g., video) and the series of photographs are used to calculate a statistical computer model of the particular body part. In this embodiment, the computer model size is determined multiple times from the series of data and a distribution of the size of the body part is created. The actual size of the body part may be estimated from the distribution of sizes determined from the series of photographs. For example, where an accelerometer is used to calculate the position of the camera in a series of photographs (e.g., video), the calculated size may return a computer model where a size of the body part has a Gaussian distribution or similar distribution having a peak. The peak of the curve of the distribution provides a statistically probable actual size of the body part.

In some embodiments, a garment fitted to the particular body part of the user is displayed for purchase by the user. The fitted garment can be displayed on an electronic device and/or offered for sale through e-commerce. In some embodiments a plurality of body part models from different users is used to build a database of body parts. The database can be a relational database that associates user garment preferences and/or fitting information to particular models. Models in the database can be compared to other models to make recommendations for particular garments and/or particular retailers of garments.

Other methods and systems disclosed herein include scanning a database of imagery of one or more people (e.g., a photo album) and detecting particular garments in the database of imagery. The methods can include determining the type, size, color, style, and/or brand of the particular garment (i.e., garment information) and associating the garment information with the person wearing the particular garment or generating a anonymous database. Information about the person wearing the garment can be anonymously associated with the particular garment in a relational database. For example, the age, sex, demographic, income, education level, personal preferences, or other characteristics of the person can be associated with the particular garment in a relational database.

In another feature of the invention, the computer model of the body part can be obtained from a scanner that is used for medical or security purposes. Medical and security scanners that provide highly accurate 3-D models of a person for purposes of medical diagnosis and security are well-known in the art. The computer model generated by the medical or security scanners can be first used to scan a person for medical purposes or security purposes and the imagery can be stored on a computer within a network for the medical facility or secured facility. Then the computer model of the body part may be transmitted outside the computer network and/or control of the medical facility or government secured facility (e.g., a hospital or airport) and to a computer network that provides garment fitting and/or associates particular garments with particular people.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

I. Introduction

Figures 1, 2:
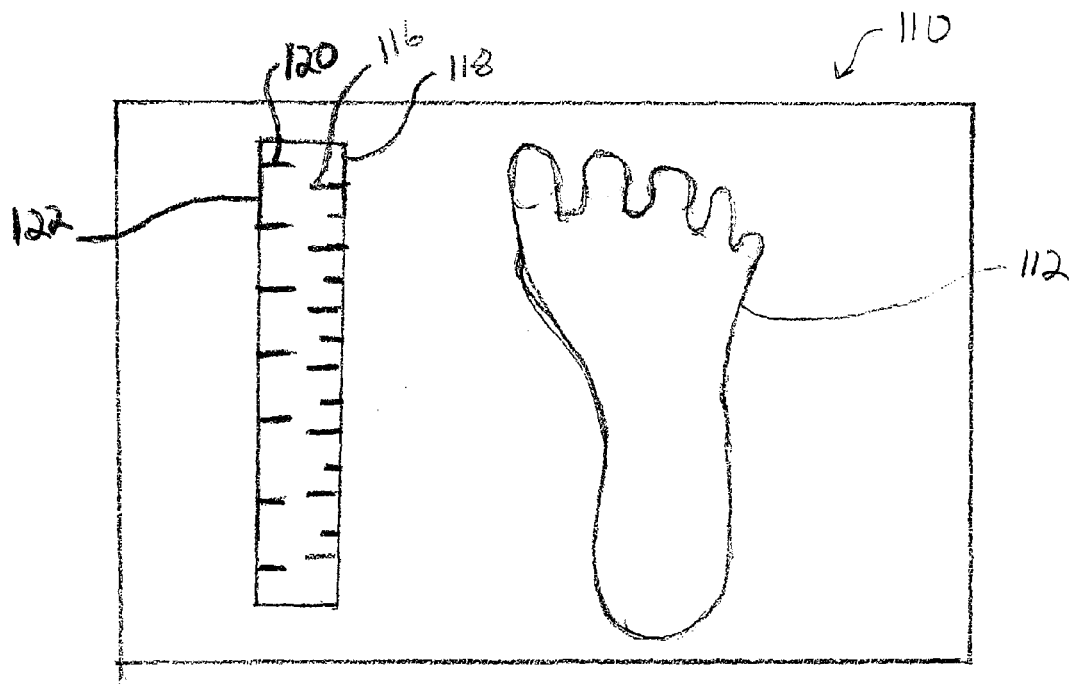
FIG. 1 illustrates a method for fitting a garment to a user according to one embodiment.
FIG. 2 illustrates a photograph that can be used in the method of FIG. 1.

The illustrative embodiments described in the detailed description and claims are not meant to be limiting. Other embodiments may be utilized, and other changes may be made, without departing from the spirit or scope of the subject matter presented herein. It will be readily understood that the aspects of the present disclosure, as generally described herein can be arranged, substituted, combined, separated, and designed in a wide variety of different configurations, all of which are explicitly contemplated herein.

The present disclosure describes methods and systems for obtaining a size measurement of a person to be fitted for a garment and computer executable instructions for performing the methods on a computing device. The size measurement is obtained in part using photographic data. The disclosure also relates to collecting garment data and creating databases of garment data useful for fitting a garment to an individual based on the size measurements obtained, where the data is created and or stored on a recordable medium using a computing device. Finally, the disclosure also relates to fitting and displaying garments to users based on the size measurements and the garment data and offering the garments for sale using the Internet and/or a display associated with a computing device.

In general the embodiments described herein may be carried out using electronic devices such as, but not limited to personal computers, server computers, and portable electronic devices such as smart phones and ultra mobile computers such as Apple Computer's iPad and iPhone. Those skilled in the art will recognize that the various embodiments described herein can be implemented in whole or in part on these types of devices.

For purposes of this invention, the term computer model can be any geometric shape including a distance between two points (e.g., a line). A 2-D computer model can be any geometric shape that includes at least two dimensions, and a 3-D computer model can be any geometric shape in at least three dimensions. A contoured computer model can be 2-D or 3-D and includes a plurality of different features in each dimension. 3-D and contoured computer models are preferred for their ability to provide fitting measurements that are different in kind compared to traditional fitting techniques such as a tape measure.

In one embodiment the present disclosure relates to methods, software, and systems for obtaining fitting measurements of particular body parts of a person for purposes of fitting the person to a garment. The body part can be a part or all of a foot, head, torso, leg, buttocks, abdomen, chest, arm, hand, or combination of any of these.

The garment can be any article of clothing or footwear that is fitted to the dimensions of a person, with the proviso that the garment is not a medical device. For purposes of this invention, the term garment refers to articles that are generally manufactured, sized, sold and used primarily by non-medical personnel. In other words, the term "garment" specifically does not include prosthetics, hearing aids, casts, splints, and other devices and materials fitted by or under the supervision of medical personnel or for the purpose of mitigating a medical condition. As such, the garments covered by the present invention are not of the type typically subject to the liability associated with medical professionals. Therefore the sizing and fitting of garments that are the subject of the present invention are highly prone to inaccuracies when carried out using traditional techniques of the garment trade. By way of example, and not limitation, the garment can be a shoe, boot, shirt, blouse, jacket, short, pant, skirt, hat, glove, eye glasses, or the like. In a preferred embodiment, the garment is a shoe or an article of clothing (i.e., made from cloth) sold in the retail garment trade. Note that while the lenses of prescription glasses are provided under the care of a medical professional, the lenses are not fitted to the shape of the person, rather the fitting is with regard to the frame, which is not under the supervision of a medical professional. Nevertheless, in some embodiments, the invention includes non-prescription glasses (e.g. sunglasses), but not prescription glasses.

The fitting measurement is determined from a computer model of at least a portion of the body part. The computer model can include any number of vectors of the body part that is useful for fitting a garment to the person. The computer model can be 1-D, 2-D, or 3-D.

The computer model is made using one or more images of the particular body part received from and taken by a portable electronic device. The images include the particular body part and optionally, but preferably, include a marking of known dimension.

With reference to FIG. 1, in one embodiment, a method 100 for obtaining a size measurement of a person to be fitted for a garment includes step 102 receiving one or more images from a portable electronic device, wherein each of the one or more images includes photographic data of a particular body part of a user; step 104 generating a computer model of at least a portion of the particular body part by analyzing the photographic data using a feature extraction technique; step 106 using the computer model to generate a fitting measurement; and step 108 providing the fitting measurement to the user.

II. Obtaining Photographic Images of a Particular Body Part

In step 102, photographic images including a body part are received. The photographic images may be captured using a portable electronic device. The portable electronic device can be any electronic device configured to capture the photographic data and transmit the images to a server computer or to execute software that analyzes the images using feature extraction technology. The portable electronic device may be an ultra-mobile device such as a smart phone, personal digital assistant, or similar device.

In one embodiment, the portable electronic device may include an operating system configured to install third party applications. The ability to install and operate third party applications can be useful for providing instructions to a user as to how to capture proper images of the body part and/or for transmitting the images to a server computer and/or for installing software that can extract features from a photographic image. Examples of suitable portable electronic devices include portable computing devices running Apple's iPhone OS, Palm WebOS, Google Android, or Windows Mobile or a similar operating system. Examples of suitable devices include Apple's iPhone and Motorola's Droid. Those skilled in the art will recognize other devices that can be programmed similar to these devices to capture images of a particular body part of a person and either transmit or analyze the data using computer executable instructions configured to extract features of the body part from image data. Portable electronic devices are devices that are configured to be held and supported by a person during use (e.g. a phone, a laptop, tablet computer, hand-held camera, etc.). Portable electronic devices do not include devices that are generally configured for use supported by a stand or a floor or table. For example, MRI machines, desktop computers, and floor supported scanners are not portable electronic devices since they are not specifically configured for portability. Hand held devices include devices that are configured to be held in the hands of a person during use, including, but not limited to point and shoot cameras and cell phones.

The photographic images received from the portable electronic device include a particular body part of a person. The particular body part present in the image may be foot, head, torso, leg, buttocks, abdomen, chest, arm, hand, or combination of any of these. In a preferred embodiment, the body part occupies a significant portion of the image. In one embodiment, at least 10%, 20%, 30%, 40% or even 50% of the image includes photographic data of the particular body part.

For the body part to be considered "in the image" the body part must either be naked or covered with a shape conforming garment. Shape conforming garments may cover the skin of the body part, but reveal the physical structure by taking on the shape of the body part.

Any number of images of the same particular body part can be received and used to create a computer model of the body part or the image received may be a three dimensional image. Where the image received is a two dimensional image, receiving two, three, four, or more images of the same particular body part improves the accuracy of the feature extraction and avoid errors caused by extracting measurements from a two-dimensional image. In a preferred embodiment, the image is a three dimensional image or a plurality of two dimensional images of the same body part from different aspects.

Using a plurality of images at different perspectives prevents errors caused by objects appearing smaller or larger than adjacent objects as a result of being closer or further away from the image sensor generating the photograph. As discussed more fully below, the step of generating a computer model can use the plurality of photographic images to correct for differences in perspective, which allows the user to use a single camera and take pictures at different distances from the body part and obtain a highly accurate three dimensional sizing of the body part. The simplicity of the input mechanism for obtaining the fitting measurement is important to persuading users to use the systems and methods described herein. Systems that require manual measurements and/or multiple cameras positioned at known distances from the body part are not workable because they require expertise in collecting the data. If an expert is needed to obtain the data, there is little or no incentive to use the method in place of simply trying the garment on.

Receiving two or more photographic images (preferably three or more photographic images) of the same body part from different aspects is achieved by the user taking a plurality of photographs from different angles. For example, the user may take a photograph of a particular body part from a left side, right side, top side, and bottom side, to collect images from different aspects. The images may be taken at different distances from the body part (i.e., the sensor may be further or closer to the body part in the series of pictures of the same body part). As described more fully below, the use of the feature extraction technique and plurality of images (or a three dimensional image) can produce a model even if the images are taken at different distances and aspects. This feature allows the user to be very imprecise in how the images are collected. So long as the body part is in the picture and fills a sufficient amount of the image to acquire useful photographic data from the image, the photographs may be taken at different focal lengths, under different lighting, and/or at different aspects. Thus, the image collection step can be very robust and simple for non-technical users. In some embodiments, the user need not understand anything more than the need to take a plurality of pictures of the same body part from different angles.

The plurality of photographic images can be still images or video. Where video is used, the plurality of photographic images is obtained from separate frames that include the particular body part and where the aspect of the particular body part changes between video frames.

Where video data is obtained, the video data may have motion sensing data associated therewith that has been taken simultaneously with the video data on the same device. As explained in more detail below, the motion data may be useful for generating a computer model and/or for estimating the actual size of the body part.

The images may also include markings of known dimensions to facilitate estimating the actual size of the body part. The markings may be provided on an object placed adjacent to the particular body part (i.e., an object adjacent to the particular body part in the photograph). The marking of known dimension may be made directly on the body part (e.g., a printed marking of known dimension), or a shape conforming garment may be placed over the body part with the marking of known dimension printed on, embedded in, or otherwise visibly disposed on the shape conforming garment.

The marking may be a single sized marking such as a dot with a particular diameter or a line measured along its length. Alternatively, the marking of known dimension may be two parallel lines where the dimension is the distance between the parallel lines. The image may preferably include a plurality of markings of known dimensions. For purposes of this invention a plurality of markings of known dimensions refers two or more single markings or a plurality of sets of markings that define a single dimension. (i.e., where the known dimension is between two parallel lines, the two lines are only a single marking of known dimension as used in the present disclosure since the marking only provides a single value). The plurality of markings of known dimension can be two, three, four, or more markings of known dimension or tens or even hundreds of individual markings of known dimension. In some embodiments, at least a portion of the markings of known dimensions are of different dimensions. (e.g., 1 inch, 1 foot, 1 mm, 1 cm, and the like). The known dimension can 1-D, 2-D, or 3-D. (i.e., a line, an area, or a volume). In embodiments where the image is a 2-D, the known dimension will typically be a 1-D or a 2-D marking.

An example of an object with markings of known dimension that can be used is a ruler. FIG. 2 depicts a photograph 110 that includes an image 112 of a foot and a ruler 114 that includes a first set of markings (e.g., including marking 116) on a first edge 118 and a second set of markings (including marking 120) on a second edge 122. The ruler may include a sets of markings (e.g., a plurality of parallel lines) that indicate millimeters, centimeters, inches, and/or ⅛ inch. Ruler 114 may have a total length of between about 6 inches and about 18 inches. In some embodiments, ruler 114 can include markings for two different sized dimensions such as inches and mm or mm and cm. As is customary with rulers, parallel lines may be of a different length to indicate different dimensions. For example, the cm markings may be all the same length and longer than the mm markings which are all the same length. Similarly, the ⅛ inch markings may be shorter than the 1 inch markings. The number of individual lines for the mm, cm, inch and/or ⅛ inch will depend on the total length of the ruler.

The actual size of the marking of known dimension may be determined from units printed on the ruler and/or provided by the user. For example, the user may provide an approximate total length and the individual spacing of the markings can be determined by counting the number of marking son the ruler and determining which markings correspond to cm, mm, inches, or ⅛ inch. In some embodiments, the actual size of the marking of known dimension can be determined from text printed on the ruler. For example, the ruler may have mm, cm, or inch, printed on the ruler to indicate the actual size of the markings.

As mentioned, in some embodiments, a shape conforming garment can cover the body part and include a marking of known dimension. The shape conforming garment has sufficient conformity to the contours of the body part so as to still allow for feature extraction techniques to analyze the contours of the particular body part. The shape conforming garment is typically made from a stretch material and then formed (e.g., sown) to a size smaller than the body part. When the garment is stretched onto the body part, the garment takes the shape of the body part. For example garment materials that include spandex and blended with synthetic or natural fibers such as polyester, cotton, wool, silk, or linen. Shape conforming materials are well known and commercially available. An example is Lycra™, available from DuPont (USA). In some embodiments, the thickness of the shape conforming material is less than about 5 mm, 2 mm, 1 mm, or even less than 0.5 mm.

The markings on the shape conforming garment may be printed on or embedded in the shape conforming garment. Printing can be carried out using an ink jet printer. The marking of known dimension can be a static fiber (i.e., a fiber that does not stretch) or printing on a portion of a static fiber. By printing the marking on a static fiber, the garment can stretch and conform without changing its size. In one embodiment a static fiber can be embedded in a stretchable fabric. The fabric can stretch, but the static fiber remains the same size. The static fiber can be a polymeric fiber embedded in a stretchable polymeric capsule attached to or embedded in a fabric.

A pattern may be printed on or embedded in the shape conforming garment. When the shape conforming object is stretched around the body part, the pattern of the stretching reveals the shape of the body part. In one embodiment, the stretch pattern includes discrete shapes having different widths and/or colors. The discrete shapes may be lines or polygonal shapes.

In one embodiment, the pattern and/or the stretch pattern may be present in a plurality of photographs and provide features that are easily extracted from the images to produce the computer model. In the foregoing embodiments, the use of a marking of known dimension can facilitate determining a size without knowing the distance between the camera lens and the object. This allows the photographs to be provided by the user without specialized equipment or a particular camera setup, which is important for deploying the systems and methods in commercial use.

The step of receiving one or more images can be carried out using a portable electronic device and optionally a network that may include the internet. The portable electronic device includes a camera that is used by a user to capture one or more photographs of a particular body part. Since the photographic data is analyzed in a digital format, it is preferable that the images be a digital image. In a preferred embodiment, the images are digital images taken with a portable electronic device having an at least a 2 megapixel digital camera sensor, more preferably at least 3 megapixel, and most preferably at least 5 megapixel. Cameras of higher megapixels may be used if desired.

The images may be obtained by a user taking one or more photographs of a particular body part to be fitted using the portable electronic device. The portable electronic device includes a camera sensor and software configured to capture an image through a lens. As discussed above, portable electronic devices capable of taking a picture are known.

Figure 3:
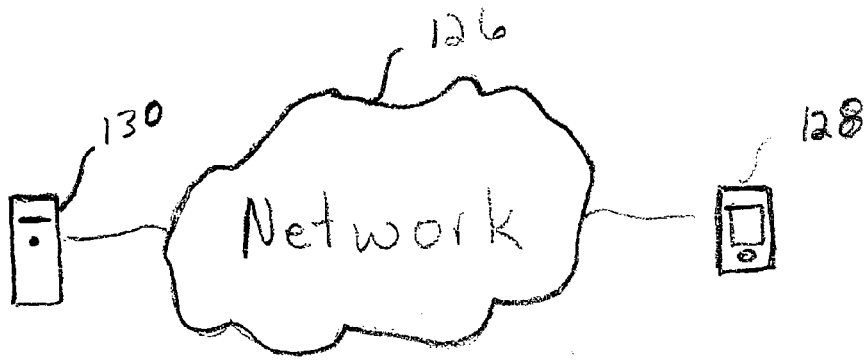
FIG. 3 illustrates an example computer network that can be used in the method of FIG. 1.

The images may be transferred to a computer configured to analyze the photographs and extract features of the body part. Prior to transmission the images may be compressed or otherwise processed. In a preferred embodiment, the images are transmitted to a server computer via a network connection that includes the internet. FIG. 3 illustrates a computing system 124 that includes a network 126, a portable electronic device 128, and a workstation or server computer 130 that can communicate with portable electronic device 128 through network 126 using known protocols. The portable electronic device may include a wireless radio and transmit the images to the sever computer over the internet. An example of a network that can be used to transmit image and other data in conjunction with an image are described in US patent application 2009/0313304 to Goodger (Dec. 17, 2009) and 2009/0271484 to Svendsen (Oct. 29, 2009), both of which are hereby incorporated by reference.

In an alternative embodiment, the image data may be processed on the portable electronic device or transmitted to a server computer through a hard wire network connection.

In one embodiment, the portable electronic device is a portable computer configured to run a dedicated application or web page that provides a user with instructions for collecting images of the particular body part. For example, the application may include computer program instructions for displaying program graphics and/or text to instruct a user to collect a plurality of images of a particular body part for purposes of fitting the body part for a garment. In one embodiment, the software running on the portable electronic device may provide a live view of the body part and framing of the body part and a capture button for capturing the image.

The software running on the portable electronic device may also receive input from the user as to a type of body part being fitted or specify the particular body part to be fitted. For example, the software can provide a list of body parts to be fitted for the user to select from or alternatively the software can specify that the software is configured to receive images for a particular type of body part. If the body part type is selected, the type of body part can be associated with the image and used in the step of extracting features from the image. Knowing the body part type can be useful for finding features in the image since body parts of a particular type tend to have similar features. However, the methods of the invention are not limited to using features that are common to all body parts of the same type (i.e., the methods may extract features that are unique to a particular body part).

The software application running on the portable electronic device may be used to provide feedback to the user to confirm whether a body part has been identified in an image received or whether additional photographs of the body part are necessary to generate the computer model of the body part. The application running on the portable electronic device may also establish an account for the user to allow the user to have access to fitting measurements and/or to prevent unauthorized users from accessing the fitting measurements. In one embodiment an account may be established by requesting an email from the user, transmitting a verification link to the user's email account, and receiving verification from the User's that the email was received.

To receive two or more images of a particular body part from two or more perspectives, the application running on the portable electronic device can be configured to prompt the user for two or more images and/or two or more images of the body part from two or more different aspects. For example, the software running on the portable electronic device may prompt the user for photographs of the right side, top side, left side and bottom side of a particular body part such as the foot.

Figure 4:
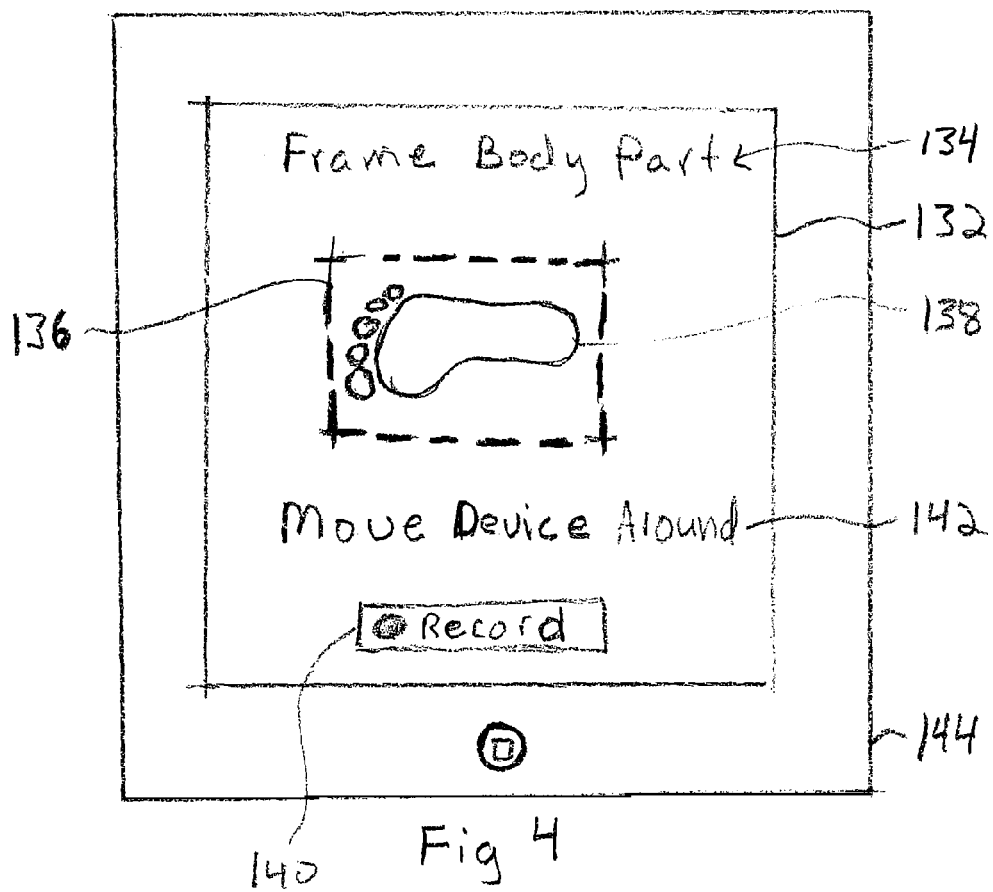
FIG. 4 illustrates a portable electronic device that can be used in the method of FIG. 1.

FIG. 4 illustrates one embodiment of a screen shot 132 of a portable electronic device 144 including computer executable instructions that can prompt a user to provide multiple images of a body part from different angles, aspects and/or distances. Screen shot 132 includes a frame 136 to display a live image from a camera sensor on a back side of device 144 (not shown). Screen shot 132 also includes text 134 instructing the user to position body part image 138 (e.g., a foot) in frame 136. Upon pressing the record button 140 on the screen of device 144, multiple images of the foot being observed by the camera sensor are recorded on the electronic device. Text 142 instructs the user to "Move the Phone Around". As the user moves the phone around the camera sensor will be at different distances and aspect ratios relative to the foot in the foot being filmed. In one embodiment, the electronic device includes a touch screen for displaying and receiving input regarding the capturing of the photographic images.

The software running on the portable electronic device may also be used to collect information regarding the state of the camera when the image was taken and the information associated with the images and/or transmitted over a network to a server computer. For example, the software running on the portable electronic device 144 may collect the focal length, which may provide an estimate of the distance from the camera sensor to the body part in the image. As discussed below, the focal length may be used in the step of generating a computer model. Other data that may be collected, associated, and/or transmitted includes flash settings, ambient lighting, location (i.e., GPS data) and/or time. Lighting can be used to account for differences in the plurality of pictures of the same body type. Time and/or GPS data can be used to indicate if images are of the same body part and/or discover whether sufficient time has passed between capture of the images that the body part may have significantly changed shape or size.

The application running on the portable electronic device may also be used to collect personal preference data from the user. For example, the application (e.g., software or computer executable instructions on an electronic device) may query the user for information about garments that the person has worn, purchased, liked, or disliked, and the labeled garment size of such garments. The query can be displayed on a screen and input received through a touch screen or a keyboard.

For embodiments where the image includes a marking of known dimension, the known dimension (i.e. actual size of the marking) can be obtained in various ways depending on the configuration of the system. In some embodiments, the known dimension can be obtained using the software running on the portable electronic device. For example, the portable electronic device can be configured to prompt the user for input of the value of the dimension of the marking of known dimension (e.e. g by displaying a request on a display screen). If received from the user (e.g., by typing on a keyboard), the marking of known dimension can be associated with the particular images that include the marking of known dimension and can be transmitted over a network to a server computer for use in the step of determining the computer model and/or fitting a garment.

The images are typically received on a server computer from the portable electronic device over a network such as, but not limited to, the Internet. The server computer may run software configured to establish a network connection with the portable electronic device and/or receive requests from software running on the portable electronic device. The server computer may establish an account with the user including a user name (i.e., logon ID) and a password. The server computer may store unique identification of the portable electronic device and/or individual users using a particular portable electronic device. As described above, the invention includes establishing an account using an email. In some embodiments, the server computer can receive the unique email address and establish an account by transmitting account information to the email address received and receive verification from the email address. The account information can be stored on the server computer in association with any of the data collected and received in the methods described herein. For example, the computer server can store computer models, fitting measurements, and/or personal preference data in association with particular accounts. In some embodiments, the user may access the account and/or fitting measurements using a device other than the portable electronic device used to send/receive the images including the particular body part to be fitted.

III. Generating A Computer Model

The methods of the invention include generating a computer model (step 104) of the particular body part. The computer model of the body part is obtained at least in part by extracting features of the body part from the photographic data. The analysis of the photographic data is typically carried out on the server computer, although the use of a server computer is not required and embodiments of the invention can include generating the computer model on the portable electronic device or using other known methods.

The computer model may be generated using a feature extraction technique. The feature extraction technique analyzes the photographic data to identify features of the body part present in the image. The particular features extracted will depend on the particular body part being analyzed. In one embodiment, the model can be a model of all or a portion of the foot, torso, buttocks, abdomen, chest, a head, a leg, or arm. The feature extraction technique can extract an identifiable feature of the body part. For example, the feature can be tendons, muscles, fat, bones, hairs, bony protrusions, skin wrinkles, moles, scars, cuts, or scabs, the shape, size, color, and/or spacing of any of the forgoing features. Using a feature extraction technique is beneficial because it allows calculations to be made using natural features of the body part, thereby avoiding the need for cumbersome equipment and/or marking techniques required using techniques known in the art.

There are many feature extraction techniques known in the art for modeling a human body from photographic data. For example, feature extraction techniques are used in face recognition software. Advanced techniques for obtaining a model of a body part from photographic data are particularly well-known in criminology where high accuracy models are needed to identify criminals from surveillance camera photographs. Examples of suitable feature extraction techniques that can be used in the present invention include, but are not limited to Principal Component Analysis (PCA), Elastic Bunch Graph Matching (EBGM), and Linear Discrimination analysis (LDA). Additional details regarding methods for analyzing photographic data to extract features of a body part can be found in US Patent Applications 2002/0031253 to Dialameh (Mar. 14, 2002); 2002/0122596 to Bradshaw (Sep. 5, 2002); 2005/0180610 to Kato (Aug. 18, 2005); 2006/0050933 to Hartwig (Mar. 9, 2006); 2006/0285770 to Lim (Dec. 21, 2006); 2009/0157707 to Ito (Jun. 18, 2009); 2010/0046842 to Conwell (Feb. 25, 2010); 2010/0103170 to Baloch (Apr. 29, 2010) 2010/0130250 to Choi (May 27, 2010); all of which are hereby incorporated herein by reference in their entirety.

As discussed above, the invention is typically carried out using a plurality of photographs. The photographic data from the two or more images may be analyzed to identify a common feature of the particular body part present in each of the two or more images. The images may be analyzed by, for example, analyzing the pixel data to identify patterns that are present in each of the two or more images. The common features can be any visual feature detectable by a camera and suitable for being analyzed by software configured to analyze photographic data for patterns. The common feature may be photographic data of tendons, muscles, fat, bones, hairs, bony protrusions, skin wrinkles, moles, scars, cuts, or scabs, the shapes, color, and/or spacing between these features.

In some embodiments, generating the computer model may include deriving a perspective of the objects in the photographic images. The perspective can be determined in part from changes in the dimensions of two, three, four or more features from different perspectives. In some embodiments, objects in the photographs that in real life would have a constant width or other dimension can be used to derive perspective by observing that the width changes in a particular way in the images. For example, where a ruler is identified in the picture, the ruler will not be perfectly rectangular unless the photograph was taken directly perpendicular to the top of the ruler. Thus, the narrowing of the rule indicates that the ruler is angled away from the camera sensor. Similarly, many of the lines on a ruler that indicate a position on the ruler can be presumed to be of the same size in real life. The perspective of the ruler can be derived by the change in size of the markings on the ruler. While this feature has been described with respect to a ruler, those skilled in the art will recognize that perspective can be derived from other features of an image using algorithms and techniques known in the art.

In some embodiments, the model can provide relative dimensions while in other embodiments, the computer model may be scaled to an actual size. Relative dimensions can be useful for determining fit, even where the actual size is not known, by providing 2-D, 3-D, and/or contoured models of the body part. For example a computer model of a foot can provide information about the arch, foot width, heel width, foot thickness, and the like relative to other parts of the foot. These relative dimensions can be used to provide a fitting measurement as described below, even if the actual size is not known or is just estimated since the relative features of the foot can be useful for determining whether a particular shoe is more suitable for a particular foot (i.e., the model can be used in combination with a database of garment models to determine a proper fit).

Notwithstanding the usefulness of a model that provides relative measurements, determining the actual size of features of the body part can be particular advantageous. Therefore, in some embodiments, actual size may be determined. Determining an estimated actual size may be performed in several different ways, including (i) deriving a size from fitting preferences provided by a user (e.g., a user provides the name and size of an article of clothing that fits and that the actual size of the garment is known), (ii) from a marking of known dimension in the photographic data, (iii) from motion data captured simultaneously with the photographic data, or similar technique.

In one embodiment, actual size may be derived by asking users to identify particular garments that the user indicates fits the particular body part being modeled. The particular garment can be scanned or otherwise modeled to determine the void space of the garment and the amount of void space can be correlated to an actual estimated size of the body part. In some embodiments, the size of the body part can be adjusted smaller based on fitting preferences, which usually include a desired amount of over-sizing of the garment relative to the body part. In a preferred embodiment, the estimated actual size is derived from fitting from a plurality of different particular garments for the same body part, where each particular garment is modeled to determine the void space. The preferred void space in the plurality of different particular garments may be averaged to determine the actual estimated size of a garment. Additional details regarding methods for making 3D models of a garment can be found in US Application Publication Nos. 2010/0293076 to End and 2011/0055053 to Rutschmann, both of which are hereby incorporated herein by reference.

In an alternative embodiment, an estimate of the actual size of the body part can be determined by obtaining image data that includes a marking of known dimension. The marking of known dimension can be used to determine the actual size of the body part. In this embodiment, an image size is determined for one or more features of the body part and an image size for the marking of known dimension. The term "image size" refers to the relative size of the object in the image (i.e., the body part and/or marking of known dimension). The image size of the object in the photograph will depend on the perspective from which the photograph was taken. The image size of the object shrinks, relative to the size of the image as the distance between the body part and the sensor producing the photographic data increases (i.e., object size in an image is inversely proportional to focal length). Objects having the exact same actual size and photographed from the exact same distance will have the exact same image size.

The computer model of the particular body part in the image may be determined in part from the difference between the image size and the actual size of the marking of known dimension. The ratio of (actual size)/(image size) of the marking of known dimension times (image size) of the common feature will give a scaled size of a feature of the body part. The scaled size of the common feature may include measurement errors caused by the orientation of the marking and the body part feature. For example, if the marking of known dimension is further away from the camera sensor than the body part, the image size of the marking of known dimension will be artificially small as compared to the body part and will result in scaling the size of the body part to a larger size than the actual size measurement. The difference in perspective can be compensated for in the size measurement by utilizing two or more images of the particular body part and analyzing the two or more images in order to make a scaling adjustment based on perspective.

The scaling adjustment can be determined in several different ways. In one embodiment, the relative image size of a marking and a common feature in the same image are compared to the image size of the same marking and common feature in the second image. An average ratio from the two measurements has a higher probability of being the correct ratio than one measurement by itself. Three, four, or more images taken from three, four, or more perspectives provides improved accuracy. In another embodiment, the scaling adjustment can be determined by providing or identifying two or more unique markings of known dimension and/or two or more common features in each image being analyzed. The number of markings of known dimension and/or common features may be 3, 4, 5, or more. By increasing the number of features in the image being analyzed, the compensation in the error due to perspective can be more precise. In a preferred embodiment, three different images of the same body part at three different perspectives and/or three or more analyzed features (i.e., the sum of common features and markings) is used to compensate for perspective to achieve an accurate scaling of image size of the particular body part, thereby generating an accurate computer model.

An estimate of the actual size of the body part may also be derived from motion data. To collect sufficient data to generate a three-dimensional model a user may record images of the object from different perspectives. For example, the user can enable a lens (e.g., activate an appropriate recording application) and move the electronic device, and thus the lens around the body part following an arbitrary or planned path, using device 144 as described above with respect to FIG. 4, for example. For example, the user can move the electronic device around the circumference of a person's head, foot, leg, waist arm, entire body, etc. As the user follows a path, the electronic device can in addition be rotated or twisted to capture different angles of the body part. In some cases, just moving the lens at many angles and around the object may be sufficient for generating a high quality three-dimensional model. However, to assist in generating a more accurate model and for generating a model with an estimated actual size of the body part, the electronic device can capture information defining the relative positioning of the images to define a three-dimensional mapping on which the images can be placed.

The electronic device can use any suitable approach to identifying spatial information to associate with each image or with video frames of a recorded video of the body part. In some embodiments, the electronic device can define an initial position relative to the body part from which a user can then begin taking images. Alternatively, a user can provide an indication of the position of the electronic device relative to the object as recording begins. The information defining the initial position of the device can then be associated with the first image or video frame captured by the lens. For example, the electronic device can define the position information as metadata associated with the image files. As another example, the electronic device can generate a distinct file referencing the captured images for the position information.

As the user moves the electronic device, the motion-sensing component (or other electronic device components) can provide an output describing the motion. The output at particular moments in time can then be associated with the particular images or video frames captured at the same moment in time. The electronic device can associate the movement information from the motion sensor output with the captured images using any suitable approach, including for example as a distinct file referencing particular images or video frames, as metadata associated with the images or video frames, or as data embedded in the images or video frames. If a video is recorded, movement information may not be associated with every video frame, but rather only with particular video frames at established intervals. For example, if a video is stored as a series of I, P and B-frames (e.g., using a video compression algorithm), movement information can be associated with only a subset of the I, P and B-frames (e.g., movement information can be associated only with I-frames and not with P or B frames). As another example, if video is stored as a series of I, P, and B-slices, movement information can be associated with only a subset of the I, P, and B-slices (e.g., only I and B-slices). The movement information (e.g., a vector) can define the movement of the electronic device relative to the origin, relative to the immediately prior position, relative to a prior position selected at a predetermined interval, or relative to any other discernable location.

The motion sensing data can be generated by accelerometers in the video capturing device.

Once the electronic device has captured a video or a series of images of the body part, and has associated movement information with the images, the electronic device can process the images and movement information to generate a three-dimensional model of the body part. For example, the electronic device can process the motion information to convert the description of the device movement from a device-centric coordinate system to an environment-based coordinate system and generate a three-dimensional frame depicting the body part recorded by the lens. The electronic device can then associate the recorded images with the frame to create a three-dimensional model having an environment-based coordinate system. In some embodiments, the electronic device can record an image of the same portion of the body part from different angles, or at different times as the device moves along a path. When processing the recorded data to form the three-dimensional model, the electronic device can combine several images of a same portion to provide a more detailed perspective of an object.

In some embodiments, the electronic device can combine several recordings of a body part to generate a more complete three-dimensional model. To properly combine the recordings, the electronic device can determine the relationship between each of the recordings.

The processing power required to convert a recorded video tagged with movement information to a three-dimensional model (e.g., to change coordinate systems associated with images of the recording) can, in some cases, exceed the capabilities of the electronic device used to record the images. For example, if the electronic device includes a hand-held portable electronic device, the device may not have sufficient processing abilities or power supply to generate a model from the recorded information. The electronic device can then provide the recording to a host device having more substantial capabilities for processing. The host device can then compute a fitting measurement and return it to the electronic device and/or provide the model to the user for display.

When using video and motion sensing to generate the computer model, the change in position coupled with a change in perspective can provide an estimate of the actual size of the body part. Additional details regarding the use of motion data in generating a 3D model can be found in U.S. Patent Application Publication 2010/0188503, which is incorporated herein by reference.

The perspective information obtained using methods known in the art can be used in calculating the scaling adjustment to arrive at a size measurement that is highly accurate. Importantly, this highly accurate size measurement can be achieved using a single camera taking a plurality of photographs at an unfixed distance from the body part. This configuration allows an untrained person with a camera and a ruler to snap a few photographs of a body part (e.g., a foot) and receive highly detailed and accurate size and shape information for that body part.

In one embodiment, the perspective of the body part in a plurality of images can be determined in part from the focal length of the camera at the time the image was captured by the portable electronic device, where the shorter the focal length, the closer body part was to the image sensor.

The computer model can also be generated in whole or in part using a statistical model of the shape variations in a body part class relating the two-dimensional projection in images to the three-dimensional shape of the body part (i.e., a statistical shape model or feature model). The recovered 3D shape is the most probable shape consistent with the 2D projections in the photographic data. The statistical shape model is first created from a bank of data, denoted "training data," where the 3D positions of the image features are known and the training data can be used to "learn" the parameters of the statistical shape model. Such data sampling can be done using e.g., binocular or multi-view stereo or range scanners. Once the model parameters are learned, the 3D shape can be computed using one or several images. The 3D shape is then used, by means of the presented invention together with the 2D image data, to identify the particular body part as having the same or similar 3D shape as a particular instance of the body part class. The known 3D shape of the particular instance can then be associated with the particular body part (i.e., the 3D shape of the particular instance of the body part class can be used as an estimate of the dimensions of the body part of the user whose fitting measurement is being determined).

The method for obtaining the computer model of the body part can include, in part, (i) obtaining at least one 2D representation of the particular body part, (ii) detecting image features in the obtained 2D representation, (iii) recovering a highly probable 3D shape of the particular body part from a body-part class consistent with 2D images of the body part using at least one obtained image where 2D features are detected and using a learned statistical multi-view shape variation. Additional details regarding the formation and use of a learned statistical multi-view shape variation to determine a 3D model of an object from 2D projections can be found in U.S. Patent Application Publication No. 2006/0039600, which is incorporated herein by reference. The use of a statistical shape model can be used to estimate the actual size and/or to estimate the general shape of a body part.

In some embodiments of the invention, the computer model size may be determined by calculating one or more dimensions of a particular body part multiple times to generate a distribution of the measurement. A method for obtaining a fitting measurement of a person to be fitted for a garment, may include (i) receiving a plurality of images, each including photographic data of a particular body part of a person, wherein the two or more images provide photographic data of the same particular body part from two or more different perspectives; (ii) analyzing the photographic data to identify one or more common features of the particular body part in the plurality of images; (iii) generating a plurality of computer models of the particular body part using the one or more common features, the plurality of computer models each providing an estimated size of a particular dimension of the particular body part, the estimated sizes of the particular dimension forming a distribution of estimated sizes of the particular dimension; and (iv) deriving an estimated actual size of the particular dimension from the distribution of estimated sizes.

The step of receiving the images including photographic data can be carried out as described above. The step of analyzing the photographic data can also be carried out using techniques described herein or other known suitable techniques for modeling a body part to determine its size in one or more dimension. The measurements may be obtained using any of the methods described herein so long as a sufficient number of the same measurement is calculated to form a distribution of sizes for the same dimension. The dimension may be any dimension of a body part, such as those discussed herein (e.g., multiple measurements from multiple pictures of the same foot to measure the same distance such as the distance between the heel and the toe).

The estimated actual size of the body part may be derived from the distribution of estimated sizes by calculating or observing modes or peaks in the distribution. For example, where an accelerometer is used to calculate the position of the camera in a series of photographs (e.g., video), the estimated (i.e., calculated) size of a particular dimension of the body part in one instance of the series of photos may be slightly different than the estimated size of the same body part from a different instance of the body part as measured using photographs that capture the body part in different positions. The calculated size of the particular body part in the different iterations of photographs will be slightly different due to errors in the accelerometer data and/or photographic data. The differences in the estimated size of the particular body part in different iterations produces a distribution of estimated sizes that are similar but distributed over a small range. In some embodiments, the distribution of estimated sizes may have a Gaussian distribution or similar distribution with one or more peaks.

The peak, mode, or similar feature of the distribution provides a statistically probable actual size of the body part. By calculating the same measurement multiple times and creating a distribution to determine the estimated actual size of a body part, highly accurate size estimates for a dimension can be determined using low quality imaging equipment. In some embodiments, the number of estimated sizes for a particular dimension of the body part can have at least 2, 3, 5, 10, 50, or 100 iterations of the particular estimated size of a dimension of the body part and the number of dimensions with multiple iterations can be 2, 3, 5, 10, 50 or 100 to form a model with tens, hundreds, thousands, or more measurements to create the computer model.

In yet another alternative embodiment, a computer model can be generated using a scanners that provide highly accurate 3-D models of a person for purposes of medical diagnosis and security are well-known in the art. The computer model generated by the medical or security scanners can be first used to scan a person for medical purposes or security purposes and the imagery can be stored on a computer within a network for the medical facility or secured facility. Then the computer model of the body part may be transmitted outside the computer network and/or control of the medical facility or government secured facility (e.g., a hospital or airport) and to a computer network that provides garment fitting and/or associates particular garments with particular people. This embodiment is useful for people that frequently travel through airports and are already being subject to a high resolution 3-D body scan or people with access to a hospital scanner. This computer model does not require the use of feature extraction technology and can be used with any of the embodiments disclosed herein. In addition, this embodiment can be used in combination with multiple scans to form a distribution of estimated sizes that is then analyzed to produce a more accurate estimate of a size of a body part.

IV. Generating a Fitting Measurement

With reference again to FIG. 1, the computer model is used to generate a fitting measurement (step 106) and provide that fitting to a user (step 108) to inform the user of a proper fitting. Alternatively the fitting measurement can be provided to an entity for targeted advertising or used in generating relational databases as described more fully below. The fitting measurement may be a body part size, a garment size, or a particular garment. The fitting measurement may be an actual size or it may be a relative size (i.e., providing relative dimensions of the different features of the body part).

In the case where the fitting measurement is a body part size, the computer model is used to determine a size of the body part. For example a model of a shoe can provide a "foot size". The body part size can be an actual size as measured in a standard unit of measure or the body part size can be an industry size. For example, when generating a fitting measurement of a foot, the fitting measurement may be the length of the foot in mm or a size that correlates with a US sizing chart (e.g., Men's size 10). Or the measurement may be a relative size between two features of the body part. For example, the fitting measurement may be a "narrow", "wide", or "neutral" indication on the width of a body part as determined by the relative length to width of the body part.

In some cases, the computer model may be a 1-D size measurement and the size measurement may be identical to the fitting measurement. For example, where a garment is sized according to the actual dimension of the body part it fits, the step of determining the fitting measurement can be carried out by identifying the size measurement and correlating the fact that the garment fitting is the same as the body size measurement. In this case, when providing the size measurement from the computer model, the user will understand that the size measurement is a fitting measurement.

In an alternative embodiment, the fitting measurement can be a garment size. In this embodiment, the computer model is compared to a garment model in a relational garment database to determine a match. The comparison can be to a computer profile (as described more fully below) in which one or more desired dimensions of the computer model (i.e., of the body part to be sized) are compared to one or more dimensions of a plurality of computer profiles in a database to determine a match. The matched computer profile has a garment size or particular garment associated with the matched computer profile. The step of generating a fitting measurement can include identifying the match to a computer profile and identifying the particular garment size associated with the profile and providing the particular garment size to the user. Alternatively, the computer profile may be associated with a particular garment or type of garment and the match to the computer profile can be used to provide a fitting measurement by providing the particular garment or type of garment to the user or directing the user to a store that offers garments that are particularly likely to fit the person (e.g., if the profile indicates oversized feet, the user can be directed to a store that specializes in shoes for oversized feet).

In yet a third embodiment, the fitting measurement may be a particular garment that is fitted to the body part. In this embodiment, the computer model of the body part to be fitted is compared to a garment model (e.g., in a relational garment database) to determine a match. One or more particular garments associated with the matched garment model in the database are provided to the user so as to generate a fitting measurement. Examples of providing a garment to a user includes suggesting a particular garment as suitable or offering the fitted garment for sale.

The foregoing methods of the invention can be used to fit a shoe, boot, shirt, blouse, jacket, short, pant, skirt, hat, eye glasses, or glove or any other similar object.

While single 1-d measurements of the computer model can be used to generate a fitting measurement (i.e., by comparing it to a garment model), the use of computer generated models allows for many measurements and/or 2-D and 3-D modeling, which can be advantageous and provide custom fitted garments. Thus, two, three, four, or more measurements and/or measurements that are in 2-D or 3-D are preferred when comparing the computer modeling to the garment modeling or computer profile to determine fitting.

In one embodiment the present invention relates to generating a fitting parameter. The fitting parameter can be obtained using a garment model that is superimposed over a computer model of the body part of the user that supports a garment identified as being worn by the user. The computer model used to generate the fitting preference data can be provided using the methods described herein (i.e., generated from photographic data) or can be derived using other known methods of generating a computer model of a body part such as using an imaging device or scanner or fixed and spaced apart dual cameras, or the like. The garment preference is generated by comparing the computer model to a garment model to identify a preferred fit. For example, the available excess spacing of the user preferred garment on the user's body can be determined by superimposing the garment model of the user preferred garment over the body part model of the user's particular body part.

The fitting parameter may be specific to a particular area or part of a body part. For example, where a shoe is fitted, the user fitting parameter may be to space in the toe box. Where pants are being fitted, the fitting parameter may be to how loose the pant is around the thigh or alternatively the waist. The fitting parameter may relate to an excess length of the pant leg (e.g., for ensuring proper pant length when sitting). In some embodiments a plurality of fitting parameters of different regions of the garment can be used to determine proper fit. Hang data can also be used to determine proper fit. Where extra spacing is provided in a garment, the hang data can be representative of how the garment will hang on a body part of particular dimensions. For example, the waist size of a pant is typically oversized and the fabric hangs off the hips. The hang data can be used in combination with the fitting parameter to provide the drop of the waste line of the garment being fitted to the waist of the user. Because the waist line of the garment drops, the spacing does not result in a gap between the fabric of the garment and the particular body part. Rather, in use the spacing results in a particular "hang" of the clothing. In other embodiments the spacing defined by the fitting parameter may result in wrinkling or folding of the fabric. For example, where the actual garment has spacing in the thigh area of a pant leg, the extra spacing will result in folding of the fabric rather than actual space when the garment is actually worn. This folding caused by how the garment hangs influences fit and look. Thus, in one embodiment, the hang data may include fold size and/or fold number for a given amount of spacing (as evidenced by the difference in size measurements between the garment model and the computer model). The fitting parameter can be used to provide a fitting measurement to a user and/or may be stored in a relational database of user profiles and/or garment profiles as described below.

Fitting a garment can be difficult using traditional methods because traditional measurements typically only use a single vector and the accuracy of the measurement of the single vector is often poor estimated. In many cases a person is not capable of measuring his or her own body size (e.g., using a tape measure) due to the lack of accurate readings (hence the need for tailors). Electronic measurements using photographs as described herein can provide accurate measures and/or multiple measurements of the same body part.

In contrast, the fitting measurement of the present invention can use comparisons of highly accurate measurements generated by a computer and/or can include comparisons or fittings of a plurality of measurements for a single body part, thereby increasing the chance of a proper fit as compared to traditional fitting techniques.

V. Generating A Garment Database

The methods of the disclosure also relate to methods for generating a garment database that includes garment items or garment sizes associated with a computer profile or a garment model. The computer profile or garment model has size dimensions or other features that can be compared with the computer model of a body part to determining a match (i.e. proper fitting) or user preferences. The garment database can be used for fitting a particular body part to a particular garment and for associating particular user preferences with particular garments.

In one embodiment, the invention includes generating a garment database including a plurality of garment items. In one embodiment, the garment items in the database may be selected from the group of a shoe, boot, shirt, blouse, jacket, short, pant, skirt, hat, eye glasses, glove or a combination thereof.

In one embodiment, the garment database includes at least a plurality of unique garments. For purposes of this invention unique garments are different in more than just manufacturer size and/or style. Therefore unique garment items have differing garment models for a given "manufacturer's garment size". The garment database can include more than 5, 10, or even 100 unique garment items for a single type of garment (e.g., particular manufacturer's shoe models). Where the database includes different types of garment items (e.g., shoes, shirts, pants, hats, etc.) the number of unique garment items in the database may be greater than 10, 100, or even 1000.

The garment database may be a relational database in which each garment item has a garment model, a garment profile, and/or a computer profile associated therewith. The garment model provides 1-D, 2-D, and/or 3-D modeling of the space defined by the garment. For example, the garment modeling can define the 1-D, 2-D, 3-D, and/or contoured void space within a shoe, shirt, pant, glove, etc. A garment profile includes user preferences related to the fitting of a particular garment. A computer profile is a computer model of the body part that is associated with the particular garment or garment model and/or profile.

With regard to the garment model, the garment model can be the actual space defined by the garment for receiving the body part. In this embodiment, the garment model is typically achieved from scanning the real-life garment or obtaining a design model of the garment or derived from multiple fitted computer models.

The garment model can be obtained from design models of the garment used to manufacture the garment. For example, real-life garments are often made from computer design models. These computer design models can be used to obtain desired measurements, dimensions, and/or other features useful for comparing to the computer model of the body part. The design models can be used to create a relational database of garment items with comparison parameters. The comparison parameter is associated with the garment item and includes size dimensions or other features of the garment that are useful for comparing to a computer model of the body part.

In yet another embodiment, the garment models in the database can be created in part by scanning a real-life garment. The scanning may be carried out using a camera (i.e., photographic data), an MRI scanner, an x-ray scanner, a sonar scanner, an infrared scanner, a digital camera, or a combination thereof. The garment is scanned in its expanded position (i.e., with the intend volume for the body part occupied either by a mannequin or air or other suitable filler). The scanner is used to detect the dimensions of the spacing that the garment provides for a fitted body part.

In one embodiment, the garment model is generated by placing a garment conforming object inside the garment and detecting the size and/or shape of the garment conforming object using the scanner. The garment conforming object must be detectable when viewed with the particular scanning device. For example, a camera may be used where the spacing is visible (e.g., glasses). Where an x-ray scanner is used the exterior of the object may be radiopaque; for a sonar scanner the exterior can reflect radio waves; for an infrared scanner the space within the garment could radiate a particular heat pattern. Those skilled in the art are familiar with devices that generate a model of an interior space. By way of example and not limitation, an inflatable bag may be coated with a radiopaque pigment (e.g., a silver paint) and then placed into a garment such as a shoe and expanded to occupy the space in the shoe. An x-ray scanner can then scan the bag and create a three dimensional model of the inside of the shoe. Those skilled in the art will recognize other materials that can be inserted into the space of garment and scanned to generate the dimensions of the space within the garment.

The garment model can include any dimensions suitable for doing a comparison with the computer model. For example, the garment model can include any measurement of 1-D, 2-D, 3-D, or contoured data that is of a corresponding type to any measurement of the 1-D, 2-D, 3-D, or contoured data of the computer model. Suitable dimensions include length, width, volumes, of any features of the particular body part as compared to the computer profile or garment model (e.g., the spacing that fills the garment).

The space defined by the garment need not be a volume. For example, where the garment is a pair of eye glasses, the spacing can be the width defined by the width of the left and right ear pieces (with the glasses in the open position).

In some embodiments, the garment model can include the actual dimensions and/or features of the material of the garment (e.g., volume, color, etc.). This data can be useful for electronically displaying a model of the garment on a model of the body part, but is not necessary for fitting.

The computer model can be used for fitting in two distinct ways. In one embodiment, the garment model can be superimposed on a computer model to determine fit and/or preference data. In an alternative embodiment, garment models may be compared to one another to determine similarities and dissimilarities. In this embodiment, garments that are known to fit a user can be used to identify other garments having a similar garment model that are therefore also likely to fit the user. Additional details for generating garment models is described in US2010/0293076.

Alternatively or in addition to a garment model, the relational database can include a computer profile. In this embodiment, a computer model or a plurality of computer models (i.e., of a body part) can be used to create a computer profile that is associated with one or more particular garments in the database.

The computer profiles of garments can be used to perform garment fitting. Garments that have profiles with measurements that are similar (i.e., within a desired size range) can be identified be identified and used for fitting. A user whose body part has a good fit to one garment can be identified as fitting another garment that has a similar profile (i.e., dimensions within a particular range acceptable for a proper fit).

A computer profile can be generated by creating or selecting a computer model that provides a "best fit" for one or more particular garment item in the database. The fit may be determined by comparing a computer model with a garment model or by receiving input from a user regarding a garment with a suitable fit. The fit may relate to any of the dimensions described herein including length, width, volume, thickness, contour, etc., of one or more features of the body part.

The computer profile may be an average of a plurality of computer models having similar dimensions. In one embodiment, the computer profile may be an average of a plurality of computer models where the users have indicated owning the particular garment and/or preferring the fit of the particular garment in the database. In one embodiment, the database can include at least 10 computer profiles, more preferably at least about 20, 50, 100, or even 1000 computer profiles.

Individual computer profiles may be associated with one or more different garment items in the database and one or more garment items may be associated with a particular computer profile. The computer profile may be used in a relational database alone or in combination with particular garments. When used alone, the computer profiles may be associated with a respective garment size and the garment size can be used to provide a fitting measurement to a user.

The use of a computer profile in association with a particular garment is advantageous because it associates common preferred features of a body part with the particular garment.

The method can also include a profile spacing or oversizing between the garment material and the body part (associated with a garment item in the database). This spacing is the desired spacing between the particular body part and the garment material in a properly fitted or comfortably fitted garment. The profile spacing is the selected spacing associated with the garment item and may be different than the actual desired spacing of any given particular user. When fitting a particular user, the profile spacing can be adjusted according to the personal preference spacing of a particular user. The profile spacing can be determined by comparing a computer profile to garment model and identifying the oversized dimensions of the garment as compared to the computer profile.

The garment items in the database may include garment profile data. The garment profile data can be any feature about the garment items that is useful for selecting a garment according to the particular preferences of a potential user. For example the garment profile data may be data such as stretch data, garment variation data, garment wear data and/or garment hang data associated therewith. The garment stretch data can provide the stretch properties of the material of the real-life garment. The garment variation data may include a size variation associated with different instances of the same garment (i.e., a garment of the same manufacturer's size and model number). The wear data can be a value as to the durability or wear resistance of the garment. The garment hang data can provide a value for stiffness or how the garment bends when hanging from a person or object. The garment profile data can be collected by measuring the garment properties using techniques known in the art. (e.g., measuring elongation, young's modulus, etc.)

The garment profile data is stored in the garment database in relation to particular garment items and can be searched in conjunction with fitting a garment to a user as described above.

In one embodiment, the database also includes user ratings of the garment items. For example, the garment database can include a rating on a scale from 1-5 or any other suitable metric as to whether a particular user prefers the particular garment. The database may store an average user rating for any number of users that have rated the particular garment.

The garment profile data can also include statistics or other information derived from users who do and do not own or like particular garments in garment database. Any type of preference data obtained from the user can be averaged or otherwise numerically manipulated to provide a value that can be associated with a particular garment in the database and searched for purposes of fitting a particular user preference to the garment item in the database as described more fully below.

VI. Relational Databases with Garment Preference Data and/or Personal Preference Data In one embodiment, the present invention relates to generating personal preference data and user profiles related to garments. As used herein garment preference data relates to cumulative preference data associated with a particular garment and personal preference data and user profiles relates to garment preferences associated with a particular user.

The databases including garment preference data and/or personal preference data can be used to determine a garment fit and/or to make particular recommendations of particular garment items and/or to recommend locations or retailers for buying particular garment items as described herein. The preference data may be collected directly from a user or derived from other data associated with the user.

For example, to obtain preference data directly, a computer program on an electronic device (e.g., device 144) can request data about particular garments, particular sizes of garments, or particular types of garments that the user prefers or is known to be fitted to the user and allow the user to input such data into a data field. The data received directly from the user can be further processed to derive preferences and any such data can then be stored in a relational database and queried for purposes of advertising or making garment recommendations. In one embodiment the data is received from a user and transmitted over a network to a server computer where it is stored in a relational database of garment preferences or personal preferences.

The present invention also relates to generating preference data and/or a relational database including such data by deriving preferences from an association between a particular person and a particular garment being worn by that person (e.g, such as where the particular person has a known body type, known body size, and/or known computer model as described above). The preference data can be stored in association with the particular user (i.e., personal preference data) or can be aggregated and stored in a garment database (i.e., garment preference data).

In one embodiment garment preference data can be derived from photographs where the user is wearing particular garments. In this embodiment, the particular garment being worn in the photograph can be used to derive preference to be associated with a particular user or used collectively to indicate the preferences of users that wear the particular garment.

The photographic data used to extract the garment preferences can be any image showing the particular user wearing an identifiable garment. The photographs can be obtained from a library of photos or videos on a personal computer or from a library of photos or videos in a social network or online database such as Facebook, Flikr, or YouTube. In an alternative embodiment, the photographic data can be obtained from video conferencing data or picture sharing applications. Examples of suitable video conferencing programs include Skype and Apple, Inc's Facetime. The video stream being transmitted for purposes of communication can be sampled and analyzed to generate preference data. The photographic data can be publicly available, such as but not limited to video and photographic data available on the World Wide Web. Alternatively, the photographic data can be obtained through personal files and/or transmissions such as data transmitted or stored in connection with the use of an application on a portable electronic device (e.g., third party application run on a smart phone or tablet computer) or a personal computer (e.g., a home or office desktop computer).

To obtain the preference data, the photographic data is scanned to identify the person and/or the garment being worn by the particular user that also has a known computer model of a particular body part. The identity of the user in the picture can be obtained using face detection or from a tag associated with the photograph (e.g., a Facebook tag). The identified person can then be associated with the particular garment in the photograph.

Techniques for identifying a person in a photograph using face detection are known in the art. Any technique suitable for use with the type of photographic data being scanned can be used. The face detection can be carried out using a feature extraction technique and comparing the features in the photographic data to a database of photographs of known people. Examples of techniques for carrying out face detection on photographic data can be found for example in U.S. Patent Application 2006/0039600 to Solem, which is incorporated herein by reference.

In order to associate the garment in the photographic data with a particular computer model, the particular garment in the photograph can be identified. For example, the garment present in the photograph can be identified using similar techniques as face detection except that the features extracted from the photograph are features associated with unique aspects of a garment. For example, garment features that can be used to identify particular garments can be buttons, printed graphics, pigment hues, stitch patterns, printed text, fabric patterns, fabric cuts, fabric design patterns, and the like. The spacing, size, relative size, and/or configuration of the garment features can be used to identify unique garments (e.g., a particular model of a garment from a particular manufacturer and optionally the size and color of the particular model).

In one embodiment, the actual size of the garment worn in the photograph can be determined and stored in the database or used to make assumptions about the personal preferences of the user. The actual size can be the manufacturer's size (usually small, medium, large, etc.) or the actual size can be an actual dimension such as length or width in units such as, but not limited centimeters). The actual size of the garment can be determined by knowing the dimensions of an exposed body part in the photograph (e.g., the dimensions of the head of the person wearing the garment). In this case, the relative known size of the body part in the photograph compared to the dimension of the garment in the photograph can be used to calculate an estimated actual size of the garment. The estimated actual size can be used to identify the garment in a known database of garments or can be used to generate or augment garment profile data for use in a garment database as described herein.

The match between a worn garment and a known garment can be used to associate information about the known garment with the particular person to create a personal preference database related to garments (also referred to as a user profile database).

The personal preference database can be generated by identifying a plurality of different garments worn by a particular user. The features of the plurality of different garments can then be used to infer the likes and preferences of the user. For example the identified garments and their types can be used to generate preference data such as the cost of the user's clothing, the type of clothing used by the user (e.g., suits, casual clothing, flip flops, sandals, dresses, t-shirts, sweaters, etc.), stores where the user shops, how new the user's clothing is, the fitting preferences of the user, the fabric types, preferred colors, etc.

Although not required, in a preferred embodiment, the personal preferences associated with a particular user includes at least fitting preferences. The fitting parameter can be the user desired spacing for a particular part of the garment around a particular body part alone or in combination with any other features of the garment and/or other information about the user or the garment.

A second use of a match between a garment worn by a particular user and a known garment is to associate information of the particular user with the known garment to create a profile for the known garment. For examples of information regarding the particular user that can be associated with the known garment include the users body dimensions, age, income, sex, location, social network friends, and/or garment preferences such as sizing, preferred styles, fabric types, clothing types, or any garment preferences described herein or similar garment preferences. The particular user information for a plurality of different users can be integrated to form a profile of the purchasers and/or wearers of the particular garment. Preferably profiles of the garment are generated from tens, hundreds, or thousands of unique wearers of the garment.

The garment profile database can be used to further facilitate matching between unknown garments of users and known garments as described above. In addition, the profile data associated with the garment can be used to determine the probability that a garment identified in photographic data is a match to the known garment in the garment profile database.

Alternatively the garment profile database can be used independent of garment sizing to provide focused advertising and/or marketing of the particular garments or garments targeted to the same demographic. For example, clothing that is worn by particular demographics can be targeted with advertisements for other clothing of a similar type using the garment profile database. The advertising can target particular individuals or can be general advertising intended to reach people of a particular garment preference within the general audience. The garment profile database can be used to determine the forum and/or content of the advertising.

In one embodiment advertising using the personal preference data includes determining identifying a user, accessing the personal profile of the user to determine garment preferences, selecting an advertisement based on one or more of the personal preferences, and displaying the advertisement to a personal computing device of the user.

The present invention also relates to software that allows user's access to their own computer model and/or a computer model of other people who have allowed access to such information. In one embodiment, an account can be established for a user. For each user account, the computer model of one or more body parts of the user can be stored and/or accessed by the user. The account may also have personal preference data associated therewith. The user can be asked to provide examples of particular garments that the user owns or has worn and/or that are, in the opinion of the user, are presumed to be or specified to be a good fit. The user may provide particular styles that he or she likes. The user can select preferences from a drop down list or provide preference in a text box or both. The personal preference data may be obtained electronically by transmitting a query to the user and electronically receiving an answer.

The personal preference data (e.g., fitting parameters) may be stored in the user account of the user database and used to provide fitting. For example, garment sizes or particular garments that provide the desired spacing based on the fitting parameter can be identified from a garment database and/or recommended to the user.

Personal preference data associated with a particular user account may also be compared to garment profile data stored in the garment database as discussed above. The database may be search to find garment profile data that match the personal preferences of the user searching for a fitted garment.

Additional details regarding fitting a garment to a model can be found in U.S. Pat. No. 6,968,075 to Chang (Nov. 22, 2005), which is hereby incorporated herein by reference.

The present invention also includes associating user accounts by identifying acquaintances, friends, or other personal relationships that may exist between account users and making garment recommendations that use, at least in part, the preferences of other users that have a personal relationship. For example, where two users are friends in a social network, their preferences may be similar. Other social networking data such as a user's school, residence, demographic, sex, age, personal interest, and the like may be associated with a user account and used to recommend particular fitted garments. In one embodiment, purchases of one user can be uploaded to a social network and/or social network users having an established connection with a particular social network user may be notified of the purchase and/or shown an electronic display of the garment.

The user database may be stored on server computer and user preferences may be collected as input on the portable electronic device as described above. Alternatively the account may be accessible by a user through a web page from any Internet connected computer by logging in using the account login and password.

The present invention also relates to large databases have numerous instances of user profiles and/or garment profiles where the instances of the garment profiles and user profiles have garment preference generated and/or associated therewith using any of the methods described herein. In a preferred embodiment, the user profile database having garment preferences associated therewith can have at least hundreds, thousands, tens of thousands, or hundreds of thousands of unique user profiles. The garment profile database can have tens, hundreds, thousands, or even tens of thousands of individual garments and the preference data associated therewith can be derived from hundreds, thousands, tens of thousands, hundreds of thousands, or millions of unique users. Databases derived from very large numbers of users, such as tens of thousand or millions of users are preferred because of the accuracy that is achieved by averaging preferences over a large number of people.

While the foregoing description relates to garment databases and preferences associated with garments, in an alternative embodiment the invention can be carried out on other types of personal property such as personal electronic devices (e.g., phones, personal computing devices), cars, bikes, recreational gear, and the like. Feature extraction can be carried out on photographs to identify an item of personal property and associate the personal property with a particular person from which preferences can be derived (e.g., preferences related to the personal property and/or preferences related to the particular person).

In some embodiments, an estimated relative size of the personal property as compared to a body part such as the head of a person can be used to help determine the identity of personal property in the photographic data. This estimate can be done without knowing the actual size of either. Head size of people only changes within a certain range for people. By comparing the relative size of a person's head (or other body part) the relative size of an object in a picture can be determined and this information can be used facilitate identifying the object in the photographic data. When using an estimated head size or other body part size, the accuracy of the estimate can be improved by identifying the relative age, sex, ethnicity, etc. of the person in the photograph being analyzed.

VII. Virtual Garment Store

In one embodiment, the present invention relates to offering a garment for sale or directing a user to a garment retailer that offers the garment for sale using (i) a computer model of a body part or (ii) a garment model, (iii) a user profile garment database, and/or (iv) a garment profile database produced using any of the methods described above. In a preferred embodiment, the garment is offered for sale via e-commerce and/or the garment may be displayed for sale electronically on an electronic device. The garment may be displayed by itself, but preferably is displayed in a manner simulating the garment disposed on the particular body part. In one embodiment, the garment may be displayed in a virtual store. Examples of methods for displaying the garment can be carried out using any display technology known in the art. Preferably the display technology utilizes the computer model of the particular body part to show the garment as it would appear on the user and/or how the garment hangs or folds when placed on the body part. Examples of methods and systems that can be adapted to display fitted garments using the computer model include United States Patent Applications 2003/0101105 to Vock (May 20, 2003); and U.S. Pat. No. 5,850,222 to Cone (Dec. 15, 1998); 6,160,924 to Lazar (Dec. 12, 200); 7,212,202 to Weaver (May 1, 2007); 6,901, 379 to Balter (May 31, 2005); and 7,386,429 to Fujisaki (Jun. 10, 2008), all of which are hereby incorporated herein by reference. In one embodiment, the model of the person can be used as an avatar for displaying garments. The avatar can respond to real-life movements and poster of the person. Methods for controlling a 3-D model of a person are described in U.S. patent application Ser. No. 12/475,308, filed May 29, 2009, to Polzin, which is hereby incorporated herein by reference in its entirety. The mothods for detecting body parts of a human, generating an avatar, and/or controlling the avatar, and other features described in Polzin can be used in combination with any of the features described in this Application.

The methods of the invention can be used to direct potential purchasers to an online retailer where the online retailer pays for the directing the purchaser and/or pays a certain percentage of any sales executed with the directed purchaser.

In an alternative embodiment, the methods can be executed in a brick and mortar store. A display device can be used to allow customers to view inventory and obtain proper sizing before actually trying on a particular garment in a real store. The methods and systems can save shoppers time and frustration with finding different styles and sizes. In one embodiment, the display of the garment for in-store purchase can include a map of the store and the location where a fitted garment can be found. The display or in-store purchase can be provided for personal devices owned by users and operated outside the physical store premise or alternatively, the display can include providing a portable electronic device in the physical store.

VIII. Body Distortion Applications

The present invention also relates to computer executable instructions for providing a body distortion program running on a personal electronic device that provides a user with a computer model of a body part and allows the user to distort the dimension of the user's body part to change its look as displayed on the portable electronic device. Body distortion applications are known. For example, body distortion programs are available for the Apple iPhone. Existing body distortion applications perform a "photoshop" like manipulation of a jpeg image of a person's body (e.g., a face). In contrast, the present invention relates to generating a computer model of a person's body part using a feature extraction technique and allowing the user to distort the dimensions of the computer model. The computer model used in the body distortion application of the invention can be generated using any of the techniques described herein.

Figure 5:
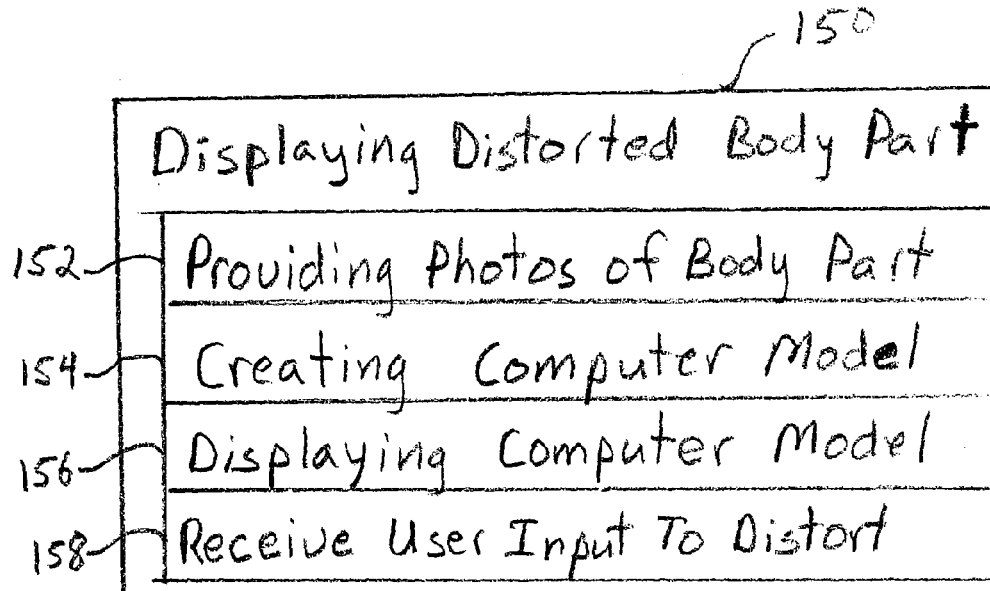
FIG. 5 illustrates a method for displaying a distortion of a body part on a portable electronic device according to an alternative embodiment of the invention.

In one embodiment a method 150 for displaying a distorted body part, as shown in FIG. 5, may include (i) step 152, providing one or more photographs of a body part of a user, (ii) step 154, using a feature extraction technique to obtain a plurality of features of the body part and generating a computer model of the body part, (iii) step 156, displaying the computer model of the body part on a screen of a personal computing device of the user, and (iv) step 158, allowing the user to distort the dimension of the body part in the computer model.

The photograph that include body part data may be obtained from a personal computer or networked computer as described above and may be transmitted to a sever computer running software that performs the feature extraction and computer modeling of the body part as described above. Once the computer model is generated, the computer model can be transmitted via a network connection to a personal computer such as a portable electronic device (e.g., smartphone, laptop, tablet, or pad), and a computer program running on the personal computer can display the computer model and provide user inputs that allow the user to distort the computer model. The user input for distorting the dimensions of the image may be a touch command such as a "pinch" on a touch screen device or may be a "click and drag" feature executed using a mouse. Those skilled in the art are familiar with providing user inputs that can allow a user to manipulate the size of a computer model of an object. In one embodiment the distortion allows a user distort the computer model to make the body part look fat or skinny. In a preferred embodiment the body part modeled includes a foot, a face, a leg, an arm, and/or a stomach area (i.e., the area between the waste and chest).

In one embodiment, the computer model of the body part can be displayed in combination with clothing. The distortion of the body part can be carried out underneath the body part and the garment can adjust to the changing shape of the underlying body part. This embodiment allows the user to see fitting if the user were to gain weight or change shape. The distortion may be a realistic distortion based on a a likely body shape that would occur if the person were to gain or lose fat and/or muscle mass. Distortions based on realistic fat and/or muscle gain or loss can be derived using photographic data of actual people that have gained or lost weight. The photographic data can be analyzed to generate a statistical model of the probability of where muscle and/or fat would most likely be gained or lost based on the gains or losses in similar areas by similarly dimensioned people who have actually gained or lost fat and/or muscle mass. However, the invention is not limited to actual distortions and the distortion may be purely fanciful and/or include distortions of dimensions other than fat and/or muscle mass (e.g., distortions that manipulate dimensions that are defined in part by bone).

Alternatively, if the garment is present on the computer model of the body part, the garment can be distorted with the body part. Such distortions may be done for mere pleasure or humor.

Where a garment is included with a computer model to be displayed and distorted on the personal computing device, a model of the particular garment may be provided in the photographic data used to generate the computer model or the garment model may be provided from a garment database such as those described above.

In a preferred embodiment, the computer model of the body part is obtained from photographic data where the body part is not covered by a garment or is covered by a shape conforming garment (e.g., a skin tight swimsuit). However, in some embodiments, the general dimensions of the body part can be determined from a garment that is only partially shape conforming or hangs in a way that prevents obtaining an accurate model of the actual body part. In such cases, the portions of the body part that can be modeled can be compared to a statistical model to infer a probabilistic model that can be distorted.

The computer model generated for purposes of the distortion app may be used in combination with any of the foregoing methods described herein.

IX. Promoting Advertising on Third Party Applications Using Data Derived from Cloud Storage Provided for Third Party Applications One challenge of promoting a new software platform is generating sufficient software development interest to provide the software applications that will drive more users to buy more hardware thereby driving more hardware sales. Software platforms are very difficult to develop because without sufficient users, the developers aren't willing to develop third party applications, but without third party applications, users aren't likely to buy the computing devices that the software developers are writing third party applications for. This problem with developing a computer platform is sometimes referred to as the "chicken vs. egg" problem.

The present invention relates to methods for promoting the development of third party application development using cloud storage and in-application advertising. The invention includes providing a computer-programming platform for which third party applications can be installed on a personal computing device. Examples include Apple's iOS, Google's Android, Window's 7 Mobile, and HP webOS. In the methods of the invention, a computer platform provider also provides cloud computing and in-application advertising. The computer platform allows third party applications to be selected, installed, and run by a user on the user's personal computing device running the computer platform provider's operating system. The computer platform provider also allows third party application to access the cloud storage and/or processing. The computer platform provider stores a plurality of users' data on the cloud storage and scans the stored data for information useful for displaying targeted advertisements. For example, the cloud data can be scanned for keywords, images, and other data related to garments, garment preferences, vacationing preferences, purchases, hobbies, interests, affiliations, social network friends, and the like to produce targeted advertising data. The targeted advertising data is data that can be used to select particular individuals for particular advertisements based on likes, dislikes, or interests derived from the targeted advertising data. For example a person that wears a particular type of clothing (e.g., skirts, suits, sandals, wetsuits, etc.) can be targeted with an advertisement directed at that type of clothing or interest. The targeted advertisements is displayed in the third party application running on the user's personal computing devices.

The software developers can promote the use of the cloud storage by designing their applications to access the cloud storage. This feature can be provided by programming functionality into the third party application that accesses the cloud storage. For example, a third party photography application can provide storage or backup for photographs on the cloud.

Since the computer platform providers are generally large-well respected companies, users are more comfortable storing their data on cloud servers owned, operated, supported, and/or secured by the computer platform providers. Moreover, since the computer platform providers are relatively few in number (e.g., less than 10) and the software developers can number in the tens of thousands, cloud servers provided by the computer platform developers can service vast numbers of potential users who only need to learn and/or understand one or a relatively few number of different cloud storage systems and providers.

In return for promoting the cloud server of the computer platform provider, the computer platform provider also provides the third party application developer with advertisements that are highly targeted to the interests of the users of the third party applications. The third party application developers generate substantial revenue from the advertising, which allows the third party application developers to develop more application and/or provide higher quality applications at a lower cost, thereby driving more sales of the devices running the computer platform providers hardware and operating system. Thus, the methods of the invention accelerate the adoption and development of the platform to the benefit of the software developer, computer platform provider, and the users.

In order for the third party applications to access the cloud storage, the computer platform provider may provide APIs in its software development kit that allow the third party software applications to call upon a cloud server to upload and/or download data from the cloud storage and/or process information to be displayed on the personal computing device of the user. In one embodiment, all or a portion of the cloud storage and/or server processing can be made free to users and/or to the third party applications that access the cloud storage and/or cloud computing power. Although not preferred, the access to the cloud can be on a fee basis paid by the users of the applications and/or the third party application developers.

The data stored on the cloud can be analyzed in any way to generate advertising data. For example, the data can be analyzed for text, images, emails, documents, web searches, program usage, peoples names, contact lists, and the like. A person's preferences, likes, and dislikes can be derived from the content of the data stored on the cloud. In one embodiment, photographs can be analyzed to determine garment preferences as described above.

The advertising provided for the third party application can be any advertising embedded in a third party application. (For purposes of this invention, third party applications do not include web browser applications, which are simply general-purpose applications used to display web content and are not built on proprietary platforms meant to run standalone applications that suffer from the "chicken-egg" problem described above). For example, the invention includes advertisements embedded in third party stand alone applications available from Apple's App store and Google's Android App store, including applications available from iAd and Admob. In one embodiment, the advertisement is related to a garment and the advertisement is targeted to a particular user based on garment preferences derived from photographic data as described above. Although advertisements related to garments are preferred, the system can also be used to serve up advertisements related to other goods such as electronics, software, food, cars, household goods, consumer goods, etc.

Figure 6:
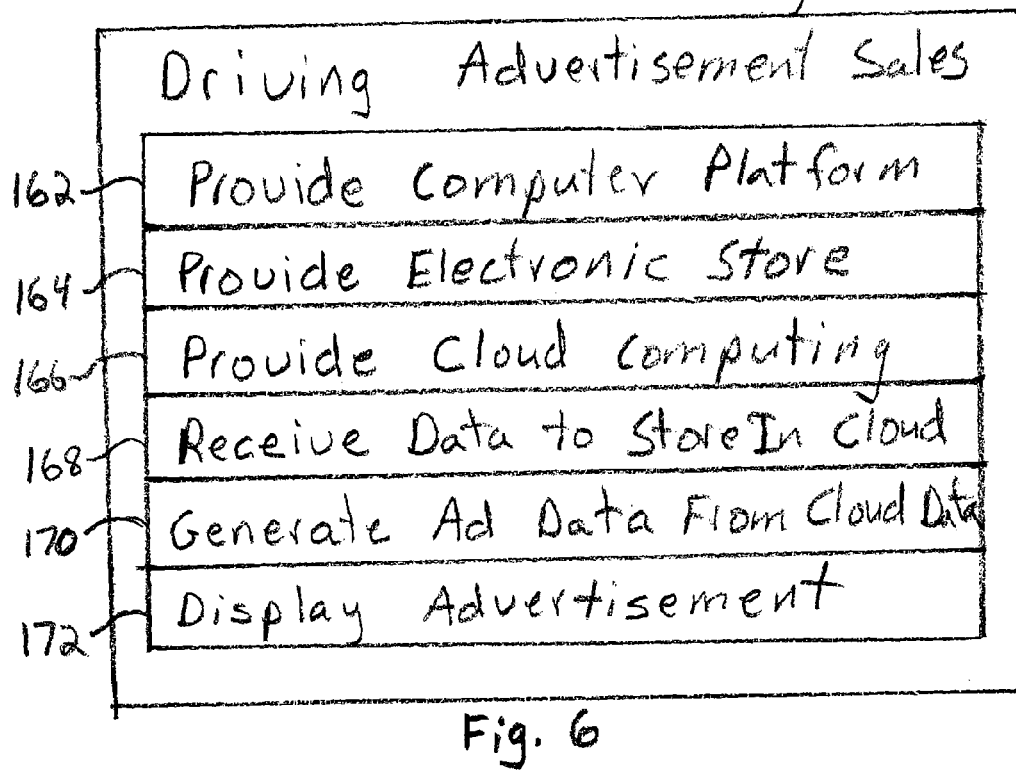
FIG. 6 illustrates a method for driving advertising sales according to an alternative embodiment of the invention.

As shown in FIG. 6, a method 160 for driving advertising in third party applications for an operating system platform may include (i) step 162, providing a computer programming platform for writing computer program applications that can be executed on a personal computing device; (ii) step 164, providing an electronic store that stores a plurality of third party computer program applications and distributes selected third party computer program applications to personal computing devices running the computer programming platform; (iii) step 166, providing cloud computing storage and/or processing accessible to at least a portion of the third party computer program applications; (iv) step 168, receiving data from the personal computing devices and storing the data on the cloud storage; (v) step 170, analyzing the data to generate advertising data; (vi) step 172, displaying paid advertisements in the third party application programs, wherein at least a portion of the revenue from the paid advertisement is provided to a developer of the third party application.

X. Computer Program Products

Figure 7:
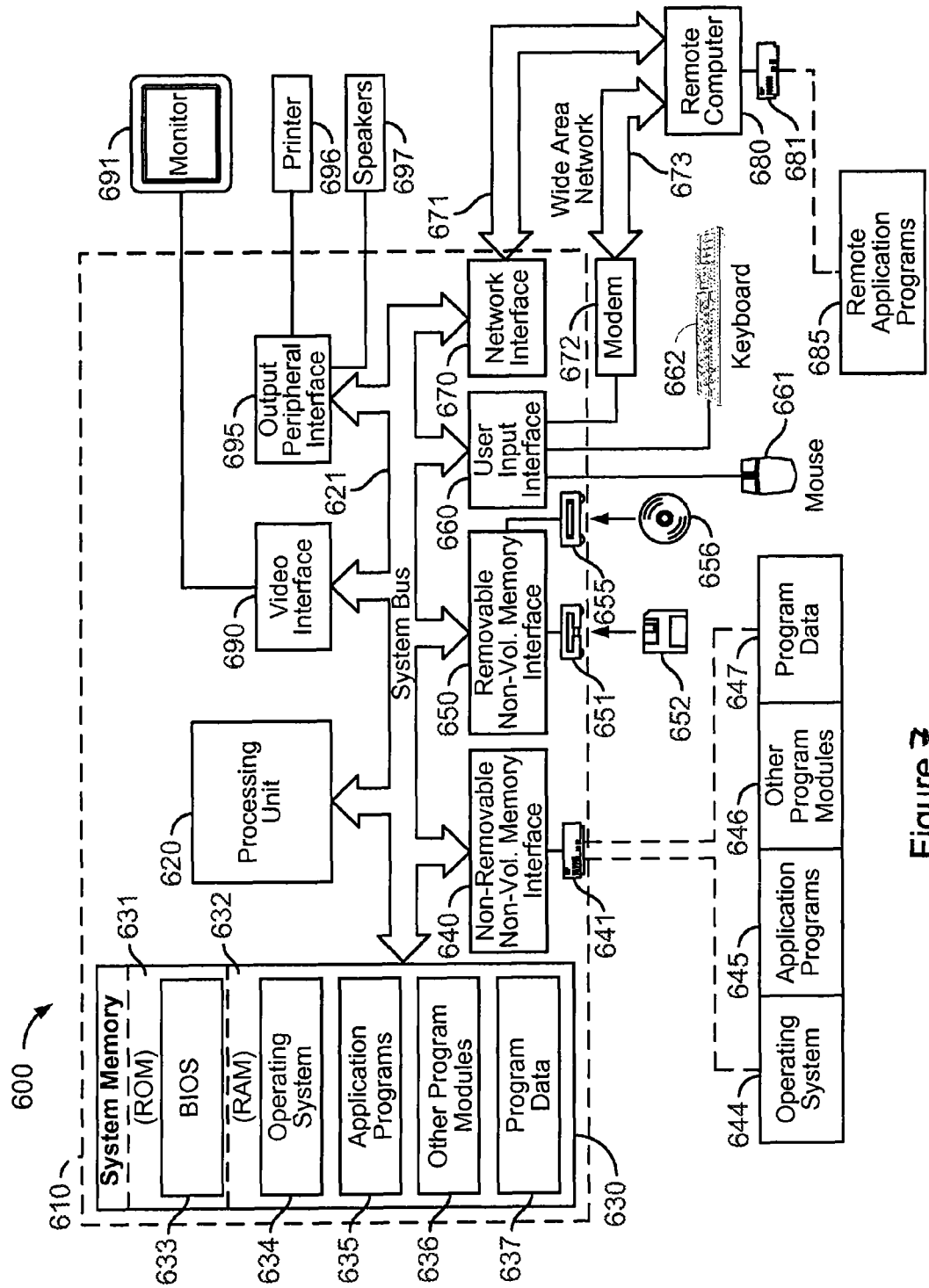
FIG. 7 illustrates an example computing environment for implementing aspects of the present technology.

An example of a computing environment for implementing the present technology is shown in FIG. 7. For example, the computing environment shown in FIG. 7 can be an example of the means for performing the acts and steps disclosed herein including those means incorporated herein. Therefore, the acts and steps of the claims can be performed by a specially programmed computer or a computer readable medium, such as optical or magnetic media with computer executable instructions stored thereon. FIG. 7 illustrates a computing environment 600 for implementing the present technology. In one embodiment, the computing environment 600 may implement the servers of systems disclosed herein as well as client devices disclosed herein.

Computing environment 600 is only one example of a suitable computing environment and is not intended to suggest any limitation as to the scope of use or functionality of the technology herein. Neither should the computing environment 600 be interpreted as having any dependency or requirement relating to any one or combination of components illustrated in the exemplary operating environment 600.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, etc., that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology herein includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 7 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through an non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 7, provide storage of computer readable instructions, data structures, program modules and other data for the computer 610. In FIG. 7, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 60 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through a output peripheral interface 690.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 7. The logical connections depicted in FIG. 7 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 7 illustrates remote application programs 685 as residing on memory device 681. It will be appreciated that the network connections shown are exemplary and other means of establishing a communications link between the computers may be used.

Any of the foregoing embodiments described above may be used alone or in combination with one another and/or the embodiments disclosed in the references incorporated herein by reference.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for obtaining a size measurement of a person to be fitted for a garment, comprising:
providing a plurality of digital images from a camera of a portable electronic device, wherein each of the plurality of digital images includes photographic data of a particular body part of a user, the plurality of photographs providing images of the particular body part from a plurality of different aspects;
generating a 3-D or contoured computer model of at least a portion of the particular body part by applying a feature extraction technique to the photographic data from the plurality of digital images, wherein generating the computer model includes estimating the size of the particular body part in a plurality of iterations using the photographic data from the plurality of different aspects;
calculating an actual size of one or more features of the particular body part;
generating a fitting measurement for a garment using the calculated actual size of the one or more features; and
providing the fitting measurement to the user.

2. A method as in claim 1, wherein the garment is selected from the group consisting of footwear, clothing, hats, gloves, or non-prescription glasses.

3. A method as in claim 1, further comprising providing motion data associated with movement of a camera capturing the plurality of digital images and using the motion data to calculate the actual size of the one or more features.

4. A method as in claim 1, wherein the one or more images include one or more markings of known dimension, the method further comprising using the known dimension in calculating the actual size of the one or more features of the particular body part.

5. A method as in claim 4, wherein the one or more markings of known dimension are used in calculating the actual size of at least two different features of the particular body part.

6. A method as in claim 1, wherein a plurality of images are received over a network at a server computer from the portable electronic device and the computer model and/or the fitting measurement are generated on the server computer.

7. A method as in claim 1, wherein the feature extraction technique is selected from the group consisting of Principal Component Analysis (PCA), Elastic Bunch Graph Matching (EBGM), or Linear Discrimination analysis (LDA).

8. A method as in claim 1, wherein three or more images are received and the three or more images provide photographic data of the particular body part from at least three different aspects.

9. A method as in claim 1, wherein the particular body part is a torso, buttocks, abdomen, chest, leg, arm, foot, or combination thereof.

10. A method as in claim 1, wherein the particular body part is a foot and the computer model includes at least two measurements selected from maximum foot length, arch height, arch position, forefoot width, heel width, midfoot volume, toe length, arch position, and/or a distance between two bone bony processes of the foot.

11. A method as in claim 1, wherein generating the fitting measurement includes comparing the computer model to a database of computer profiles and matching the computer model to at least one computer profile in the database, wherein the computer profile is associated with the fitting measurement.

12. A method as in claim 1, wherein generating the fitting measurement includes providing a garment database including a plurality of garment models and comparing the computer model to the garment model to determine a match, wherein the garment model is associated with the fitting measurement.

13. A method as in claim 1, wherein the fitting measurement is a garment size or a particular garment, the method further comprising offering a garment for sale based on the fitting measurement and displaying the offer or garment on an electronic device.

14. A method for generating a relational database, comprising performing the method of claim 1 a plurality of times for a plurality of unique users; receiving or deriving garment preference data from at least a portion of the unique users; and storing the garment preference in association with one or more particular garments.

15. A method for obtaining a fitting measurement of a person to be fitted for a garment, comprising:
receiving three or more images, each including photographic data of a particular body part of a person, wherein the three or more images provide photographic data of the same particular body part from three or more different perspectives;

analyzing the photographic data to identify one or more common features of the particular body part in the three or more images;

generating a plurality of computer models of the particular body part using the one or more common features, the plurality of computer models each providing an estimated size of a particular dimension of the particular body part, the estimated sizes of the particular dimension forming a distribution of estimated sizes of the particular dimension;

deriving an estimated actual size of the particular dimension from the distribution of estimated sizes; and wherein the steps of receiving and analyzing are carried out using images with the particular body part positioned from at least 5 different aspects and wherein the distribution of estimated sizes includes at least 5 iterations.

16. A method as in claim 15, wherein the plurality of computer models are each a 3-D model and/or a contoured model of the particular body part.

17. A method as in claim 15, wherein the particular body part is a torso, buttocks, abdomen, chest, leg, arm, foot, or combination thereof.

18. A method for fitting a person for eye glasses, comprising:

providing a plurality of digital images from a camera of a portable electronic device, wherein each of the plurality of digital images includes photographic data of a face of a user from a plurality of different aspects;

generating a 3-D or contoured computer model of at least a portion of the face by applying a feature extraction technique to the photographic data from the plurality of images, wherein generating the computer model includes estimating a size of one or more features of the face in a plurality of iterations using the photographic data of the face from the plurality of different aspects;

calculating an actual size of one or more features of the face of the user;

generating a fitting measurement for eye glasses using the calculated actual size of the one or more dimensions; and providing the fitting measurement to the user.

19. A method as in claim 18, wherein the one or more images include one or more markings of known dimension, the method further comprising using the known dimension in calculating the actual size of the one or more features of the face.

20. A method as in claim 18, wherein the fitting measurement is provided as a pair of eye glasses fitted to the face of the user.

* * * * *